(12) United States Patent
Wang et al.

(10) Patent No.: US 11,958,779 B2
(45) Date of Patent: Apr. 16, 2024

(54) MnZn FERRITE MATERIAL WITH WIDE TEMPERATURE RANGE AND LOW CONSUMPTION, AND PREPARATION METHOD THEREOF

(71) Applicant: TDG HOLDING CO., LTD, Haining (CN)

(72) Inventors: Hongjian Wang, Haining (CN); Bingbing Xing, Haining (CN); Yanfeng Huang, Haining (CN); Qiangyuan Zhang, Haining (CN); Zhixin Zhang, Haining (CN)

(73) Assignee: TDG HOLDING CO., LTD, Haining (CN)

( * ) Notice: Subject to any disclaimer, the term of this patent is extended or adjusted under 35 U.S.C. 154(b) by 412 days.

(21) Appl. No.: 17/483,844

(22) Filed: Sep. 24, 2021

(65) Prior Publication Data
US 2022/0009837 A1 Jan. 13, 2022

Related U.S. Application Data

(63) Continuation of application No. PCT/CN2020/104997, filed on Jul. 28, 2020.

(30) Foreign Application Priority Data

Jun. 30, 2020 (CN) .......................... 202010623130.6

(51) Int. Cl.
| | | |
|---|---|---|
| C04B 35/26 | (2006.01) | |
| C04B 35/626 | (2006.01) | |
| C04B 35/634 | (2006.01) | |
| C04B 35/64 | (2006.01) | |
| H01F 1/34 | (2006.01) | |
| H01F 41/02 | (2006.01) | |

(52) U.S. Cl.
CPC ...... *C04B 35/2658* (2013.01); *C04B 35/6262* (2013.01); *C04B 35/6264* (2013.01); *C04B 35/62655* (2013.01); *C04B 35/63416* (2013.01); *C04B 35/64* (2013.01); *H01F 1/344* (2013.01); *H01F 41/02* (2013.01); *C04B 2235/3224* (2013.01); *C04B 2235/3229* (2013.01); *C04B 2235/3232* (2013.01); *C04B 2235/3251* (2013.01); *C04B 2235/3274* (2013.01); *C04B 2235/3275* (2013.01); *C04B 2235/3454* (2013.01); *C04B 2235/604* (2013.01); *C04B 2235/606* (2013.01); *C04B 2235/6567* (2013.01); *C04B 2235/6584* (2013.01); *C04B 2235/763* (2013.01)

(58) Field of Classification Search
CPC ..... H01F 1/344; H01F 41/02; C04B 35/2658; C04B 35/6262; C04B 35/6264; C04B 35/62655; C04B 35/64; C04B 35/63416; C04B 2235/3224; C04B 2235/3229; C04B 2235/3232; C04B 2235/3251; C04B 2235/3274; C04B 2235/3275; C04B 2235/3454; C04B 2235/606; C04B 2235/604; C04B 2235/6567; C04B 2235/765; C04B 2235/6584
See application file for complete search history.

(56) References Cited

FOREIGN PATENT DOCUMENTS

| | | | |
|---|---|---|---|
| CN | 103951412 | A | 7/2014 |
| CN | 105036729 | A | 11/2015 |
| CN | 105330284 | A | 2/2016 |
| CN | 106810233 | A | 6/2017 |
| CN | 107151137 | A | 9/2017 |
| CN | 108793991 | A | 11/2018 |
| CN | 109678486 | A | 4/2019 |
| CN | 109836146 | A | 6/2019 |
| CN | 110078488 | A | 8/2019 |
| JP | 2006044971 | A | 2/2006 |
| JP | 2007070209 | A | 3/2007 |

*Primary Examiner* — C Melissa Koslow
(74) *Attorney, Agent, or Firm* — Bayramoglu Law Offices LLC

(57) ABSTRACT

The MnZn ferrite material includes principal components and auxiliary components, where the principal components include: 52.5 mol % to 53.8 mol % of $Fe_2O_3$, 8.8 mol % to 12 mol % of ZnO, and the balance of MnO; the auxiliary components include: 0.35 wt % to 0.5 wt % of $Co_2O_3$, 0.03 wt % to 0.08 wt % of $CaSiO_3$, 0.01 wt % to 0.04 wt % of $Nb_2O_5$, and 0.05 wt % to 0.12 wt % of $TiO_2$ and RE elemental components; the RE elemental components include one or more from the group consisting of 0 wt % to 0.04 wt % of $Gd_2O_3$, 0 wt % to 0.02 wt % of $Ho_2O_3$, and 0 wt % to 0.03 wt % of $Ce_2O_3$; the auxiliary components are all represented by a mass percentage relative to a total mass of the $Fe_2O_3$, the MnO, and the ZnO.

8 Claims, 1 Drawing Sheet

MnZn FERRITE MATERIAL WITH WIDE TEMPERATURE RANGE AND LOW CONSUMPTION, AND PREPARATION METHOD THEREOF

CROSS REFERENCE TO THE RELATED APPLICATIONS

This application is the Continuation Application of International Application No. PCT/CN2020/104997, filed on Jul. 28, 2020, which is based upon and claims priority to Chinese Patent Application No. 202010623130.6, filed on Jun. 30, 2020, the entire contents of which are incorporated herein by reference.

TECHNICAL FIELD

The present disclosure relates to the technical field of preparation and use of high-performance power ferrite soft magnetic materials, and specifically to a preparation method of a MnZn power ferrite material with a wide temperature range (25° C. to 140° C.) and low consumption.

BACKGROUND

With the rapid development of communications, computers, automotive electronics, and emerging industries such as 5G, new energy vehicles, and wearable electronic equipment, increasing requirements are imposed on magnetic functional devices. Research on MnZn ferrites accounting for more than 70% of the total output of soft ferrites has received extensive attention from scholars at home and abroad. The MnZn ferrites are required to have comprehensive performances. While meeting the saturation magnetic flux density and high magnetic permeability requirements, a MnZn power ferrite material is not only required to have low power consumption near an operating temperature, but also required to have low power consumption even in low-power states especially in the standby mode. This poses a challenge to traditional wide-temperature-range materials that show low consumption only for specific temperature ranges. In particular, more stringent requirements are presented on the wide-temperature-range characteristics of materials used in new energy vehicle on-board chargers, charging stations/piles, mobile base stations, and other outdoor work scenarios.

Representative wide-temperature-range materials abroad, such as TDK PC95, have relatively low consumption at 25° C. to 100° C., but are not suitable for long-term operation at 100° C. or a higher temperature. Wide-temperature-range materials of other companies also focus on the consumption reduction in a specified temperature range, resulting in typically poor wide-temperature-range characteristics of a material.

Chinese patent CN109678486A discloses a MnZn ferrite material with a wide temperature range, low temperature coefficient, and low power consumption. The MnZn ferrite material is composed of principal components and auxiliary components, where the principal components include: $Fe_2O_3$: 52.7 mol % to 53.5 mol %, ZnO: 8.6 mol % to 9.6 mol %, $GeO_2$: 0.007 mol % to 0.022 mol %, and MnO: the balance; and the auxiliary components include: $CaCO_3$: 0.03 wt % to 0.04 wt %, $K_2O$: 0.02 wt % to 0.03 wt %, and $Cu_2O_3$: 0.4 wt % to 0.5 wt %. In this patent, the composition of the principal formula and the way of impurity addition are adjusted to obtain a MnZn ferrite material with a saturation magnetic flux density of greater than 440 mT and a power consumption Pcv coefficient of less than 340 kW/m³ at 100 kHz. The material has a low temperature coefficient in the overall temperature range and low consumption in the high-temperature range, but shows unsatisfactory consumption performance at 25° C. to 100° C.

Chinese patent CN109836146A discloses a MnZn ferrite with ultra-low power consumption at a high temperature, and a preparation method thereof. The MnZn ferrite is composed of principal components and additive auxiliary components, where the principal components include, in mole percentage: $Fe_2O_3$: 52.9 mol % to 53.4 mol %, ZnO: 9.0 mol % to 9.8 mol %, and MnO: the balance; and the additive auxiliary components include, based on a percentage in a total weight of the principal components: $CaCO_3$: 0.03% to 0.05%, $Nb_2O_5$: 0.02% to 0.03%, $Co_2O_3$: 0.3% to 0.4%, $ZrO_2$: 0.01% to 0.03%, and $KHCO_3$: 0.0050% to 0.020%. A pre-sintered material is subjected to secondary grinding and particle sorting cyclone, and after processes such as granulation, pressure forming, and sintering under controlled atmosphere/temperature conditions, the MnZn ferrite with ultra-low power consumption at a high temperature is obtained. The MnZn ferrite has a compact microstructure, uniform crystal grains, and low power consumption in a high-temperature range of 100° C. to 160° C., and has high saturation magnetic flux density and magnetic permeability. This material has low consumption in a high-temperature range and high Bs, but shows overhigh consumption in a room-temperature range.

In summary, the development of a MnZn ferrite material that has low consumption in both a high-temperature range and a room-temperature range and also has high initial magnetic permeability and saturation magnetic flux density is of important application and market values.

SUMMARY

The present disclosure is intended to provide a novel low-power-consumption MnZn ferrite material with excellent power consumption characteristics in a temperature range of 25° C. to 140° C. and a preparation method thereof.

In the present disclosure, a $Fe^{2+}$ content is controlled by optimizing a ratio of principal components to doped impurities. An anisotropy constant $K_1$ is compensated in combination with the action of $Co^{3+}$ to make the material have a high initial magnetic permeability and reduce hysteresis loss. As the impurities in the grain boundary phase and the RE element have a large ion radius and cannot replace $Fe^{3+}$ at the spinel sites A or B, the grain boundary segregation can improve the electrical resistivity and reduce the eddy-current loss.

The present disclosure creatively proposes to mix two or more pre-sintered materials obtained under different pre-sintering conditions, such that low-activity pre-sintered materials can inhibit the grain growth of high-activity pre-sintered materials in the early stage of grain growth during sintering and thus local grain mutant growth is not likely to occur. With the increase of sintering temperature and the extension of sintering time, the low-activity pre-sintered materials acquire sufficient activation energy at the later stage of grain growth and gradually grow up to a size of pre-grown grains, which plays the role of filling large gaps among grains, optimizes the microscopic structure, improves the grain uniformity, and reduces the porosity. With the inhibitory effect of the low-activity pre-sintered materials on the high-activity pre-sintered materials, elements that inhibit the grain growth can be reduced or even replaced from a formula. On the one hand, as non-magnetic substances, the elements that inhibit the grain growth will cause the reduction of Bs. On the other hand, improper control of an additional amount or local agglomeration will cause the lattice distortion and the generation of microscopic stress, thereby compromising the electromagnetic performance of the material.

Specifically, the present disclosure provides the following technical solutions:

A MnZn ferrite material with a wide temperature range and low consumption is provided, including principal components and auxiliary components, where the principal components include: 52.5 mol % to 53.8 mol % of $Fe_2O_3$, 8.8 mol % to 12 mol % of ZnO, and the balance of MnO;

the auxiliary components include: 0.35 wt % to 0.5 wt % of $Co_2O_3$, 0.03 wt % to 0.08 wt % of $CaSiO_3$, 0.01 wt % to 0.04 wt % of $Nb_2O_5$, and 0.05 wt % to 0.12 wt % of $TiO_2$ and RE elemental components; the RE elemental components include one or more from the group consisting of 0 wt % to 0.04 wt % of $Gd_2O_3$, 0 wt % to 0.02 wt % of $Ho_2O_3$, and 0 wt % to 0.03 wt % of $Ce_2O_3$; and the auxiliary components are represented by a mass percentage relative to the total mass of the $Fe_2O_3$, the MnO, and the ZnO.

A preparation method of the MnZn ferrite material with a wide temperature range and low consumption is also provided, specifically including the following steps:

(1) preparing the principal components $Fe_2O_3$, MnO, and ZnO according to the proportions of the principal components, mixing the principal components through one-time grinding to obtain a uniform mixed powder, and conducting pre-sintering under different pre-sintering conditions to obtain at least two MnZn ferrite pre-sintered materials with a spinel structure, where the different pre-sintering conditions are adopted to obtain pre-sintered materials with an activity span;

(2) thoroughly mixing the at least two pre-sintered materials obtained under the different pre-sintering conditions in a specified ratio;

(3) adding the auxiliary components designed according to the proportions to a mixed material obtained in step (2), and further grinding a resulting mixture to a particle size D50 of 1.2 μm to 1.6 μm; during which deionized water was added in a deionized water-raw material ratio of 5:4 to obtain a slurry;

(4) drying a slurry obtained from the grinding, adding 15% PVA, and conducting granulation; sieving a granulation powder to remove unevenly-granulated particles, and drying the granulation powder at 100° C. to 150° C. for 10 min to 20 min to obtain a powder with prominent flowability and filling property; and pressing the powder into a 25*15*8 mm green body ring under a pressure of 300 MPa to 350 MPa; and (5) subjecting the green body ring obtained in step (4) to sintering in a bell furnace to obtain a MnZn ferrite sample ring.

Preferably, in step (1), the pre-sintering may be conducted for 2 h to 3 h at 700° C. and 1,000° C. and an oxygen content controlled at 5 vol % to 20 vol % by controlling a ratio of air to nitrogen.

Preferably, in step (2), 2 to 4 pre-sintered materials obtained under 2 to 4 pre-sintering temperatures may be mixed. The pre-sintered materials may be mixed by a V-shaped powder mixer or a five-axis powder mixer, or the pre-sintered materials may be mixed may be mixed after a solvent is added, where the solvent may be deionized water or ethanol. An appropriate amount of a dispersant may be added to improve the thoroughness of the mixing.

Preferably, in step (4), a mold equipped with a vibration device may be used in the pressing, and slight high-frequency vibration may be provided to make the powder densely packed and filled in a cavity of the mold, such that the powder has a high tap density in the cavity of the mold.

Preferably, in step (5), the sintering may be conducted at a holding temperature of 1,260° C. to 1,300° C., a holding time of 4 h to 8 h, and an oxygen content of 3.5 vol % to 4.6 vol %.

Compared with the prior art, the present disclosure has the following beneficial effects:

(1) This material with a wide temperature range and low consumption is suitable for scenarios with a wide temperature variation range, and considers the consumption under both high load at a high temperature and low load at a low temperature to keep a consumption curve smooth in the entire application temperature range.

(2) This material has $P_{cv} \leq 220$ kW/m³ at 25° C., $P_{cv} \leq 250$ kW/m³ at 100° C., and $P_{cv} \leq 330$ kW/m³ at 140° C. While taking into account the wide-temperature-range characteristics, the material has 25° C. Bs: 540 mT, 100° C. Bs: 420 mT, and an initial magnetic permeability $\mu_i$ of 3,500±25% at room temperature.

DETAILED DESCRIPTION OF THE EMBODIMENTS

Figure 1:
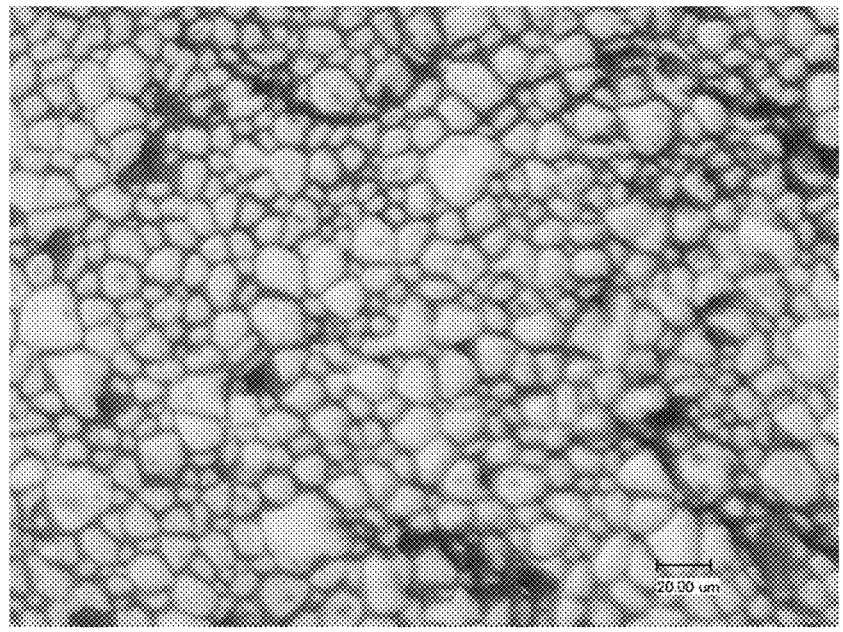
FIG. 1 is an image illustrating a metallographic structure of Comparative Example 7* of the present disclosure.

The technical solutions in the examples of the present disclosure are clearly and completely described below with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

Examples 1 to 5 and Comparative Examples 6* to 8*

A MnZn power ferrite material was prepared by the following specific steps:

(1) Commercially-available $Fe_2O_3$ (purity ≥99.3%), MnO (Mn content ≥71%), and ZnO (purity ≥99.7%) were prepared according to the principal formula: $Fe_2O_3$: 52.5 mol %, ZnO: 8.8 mol %, and MnO: the balance.

The prepared raw materials were placed in a sand mill, deionized water was added at a ratio of 1:1, then 2 ml of ethylene glycol (EG) was added as a dispersant, and a resulting mixture was mixed for 15 min and then dried.

A dried powder was divided into two parts, one part was subjected to pre-sintering for 2 h at 700° C. under an air atmosphere (with an oxygen content of 20 vol %) in an electric resistance furnace, and the other part was subjected to pre-sintering for 2 h at 900° C. under the air atmosphere (with an oxygen content of 20 vol %) in an electric resistance furnace.

(2) Pre-sintered powders were mixed according to a ratio shown in Table 1 by a V-shaped powder mixer for 2 h.
(3) The following impurities were added to a mixed pre-sintered material: $CaSiO_3$: 500 ppm, $Nb_2O_5$: 200 ppm, $Co_2O_3$: 4,000 ppm, $TiO_2$: 800 ppm, and $Gd_2O_3$: 350 ppm, and a resulting mixture was subjected to secondary sanding for 60 min to control a particle size D50 at 1.2 μm to 1.5 μm, during which deionized water was added in a deionized water-raw material ratio of 5:4; and a slurry obtained from the secondary sanding was dried to completely remove moisture.
(4) A dried powder was crushed and sieved through a 40-mesh sieve, 15% PVA was added, and granulation was conducted; and a granulation product was dried at 130° C. for 15 min, and then bidirectionally pressed by a 16-ton pressing machine into a green body ring with an inner diameter of 15 mm, an outer diameter of 25 mm, a height of 8 mm, and a density of about 3.1 g/cm³. The 16-ton pressing machine was equipped with a vibration device, and slight high-frequency vibration was provided to make the powder densely packed and filled in a cavity of the mold, such that the powder had a high tap density in the cavity of the mold.
(5) Finally, the green body ring was subjected to sintering for 6 h at 1,280° C. and an oxygen partial pressure of 3.8 vol %, then cooled to 120° C. at an equilibrium oxygen partial pressure, and taken out.

A sample ring obtained in the above step was tested for power consumption Pcv and saturation magnetic flux density Bs on the SY8218 instrument of Iwatsu, Japan. Test conditions were as follows: Pcv was tested at 100 kHz and 200 mT; and Bs was tested at 1 kHz and 1,194 A/m. Results were recorded in Table 1.

Examples 9 to 17 and Comparative Example 18*

A MnZn power ferrite material was prepared by the following specific steps:
(1) In Examples 9 to 17, commercially-available $Fe_2O_3$ (purity ≥99.3%), MnO (Mn content ≥71%), and ZnO (purity ≥99.7%) were prepared according to the principal formula: $Fe_2O_3$: 52.98 mol %, ZnO: 10.3 mol %, and MnO: the balance. In Comparative Example 18*, the raw materials were prepared according to the principal formula: $Fe_2O_3$: 53.8 mol %, ZnO: 12 mol %, and MnO: the balance.
(2) The prepared raw materials were placed in a sand mill, deionized water was added at a ratio of 1:1, then 2 ml of EG was added as a dispersant, and a resulting mixture was mixed for 15 min and then dried.
(3) A dried powder was divided into two parts, one part was subjected to pre-sintering for 2 h at 800° C. under an air atmosphere in an electric resistance furnace, and the other part was subjected to pre-sintering for 2 h at 900° C. under the air atmosphere in an electric resistance furnace, where the air atmosphere had an oxygen content of 20 vol % in Examples 9 to 13 and Comparative Example 18*, an oxygen content of 15 vol % in Examples 14 and 15, and an oxygen content of 5 vol % in Examples 16 and 17. Pre-sintered powders were mixed according to a ratio shown in Table 2 by a V-shaped powder mixer for 2 h.
(4) The following impurities were added to a mixed pre-sintered material: $CaSiO_3$: 500 ppm, $Nb_2O_5$: 200 ppm, $Co_2O_3$: 4,000 ppm, $TiO_2$: 650 ppm, and $Ho_2O_3$: 150 ppm, and a resulting mixture was subjected to secondary sanding for 60 min to control a particle size

TABLE 1

| No. | Ratio of pre-sintered materials | ui | Pcv/25° C. kW/m³ | Pcv/100° C. kW/m³ | Pcv/120° C. kW/m³ | Pcv/140° C. kW/m³ | Bs(mT)/ 25° C. | Bs(mT)/ 100° C. |
|---|---|---|---|---|---|---|---|---|
| 1 | 700° C. (90%) + 900° C. (10%) | 3236 | 244 | 305 | 331 | 372 | 537 | 413 |
| 2 | 700° C. (80%) + 900° C. (20%) | 3327 | 233 | 287 | 326 | 358 | 543 | 421 |
| 3 | 700° C. (70%) + 900° C. (30%) | 3512 | 235 | 266 | 305 | 343 | 542 | 415 |
| 4 | 700° C. (60%) + 900° C. (40%) | 3267 | 323 | 322 | 345 | 378 | 538 | 415 |
| 5 | 700° C. (50%) + 900° C. (50%) | 3234 | 346 | 355 | 374 | 403 | 531 | 412 |
| 6* | 700° C. (100%) | 3237 | 342 | 345 | 362 | 393 | 533 | 415 |
| 7* | 800° C. (100%) | 3244 | 267 | 286 | 322 | 369 | 542 | 417 |
| 8* | 900° C. (100%) | 3256 | 287 | 312 | 346 | 380 | 537 | 418 |

Notes:
The number with * represents a comparative example. Among the examples shown in Table 1, 1 to 5 represent the examples of the present disclosure, and 6* to 8* represent the comparative examples.

According to the data in Table 1:

Among Examples 1 to 5, when an amount of the low-activity pre-sintered material accounts for 30% in a total amount of a mixed pre-sintered material, a resulting product has the best performance; and when an amount of the low-activity pre-sintered material and an amount of the high-activity pre-sintered material each account for 50% in a total amount of a mixed pre-sintered material, a resulting product has the worst performance, which is even worse than that of a product obtained from a pre-sintered material obtained under a single temperature.

From the comparison of Examples 6* to 8*, it can be known that a suitable single pre-sintering temperature for a powder is 800° C., but the overall consumption, especially the consumption in a high-temperature range, is worse than that of Example 3. An image illustrating a metallographic structure of Comparative Example 7* is shown in FIG. 1.

D50 at 1.2 μm to 1.5 μm, during which deionized water was added in a deionized water-raw material ratio of 5:4; and a slurry obtained from the secondary sanding was dried to completely remove moisture.
(5) A dried powder was crushed and sieved through a 40-mesh sieve, 15% PVA was added, and granulation was conducted; and a granulation product was dried at 130° C. for 15 min, and then bidirectionally pressed by a 16-ton pressing machine into a green body ring with an inner diameter of 15 mm, an outer diameter of 25 mm, a height of 8 mm, and a density of about 3.1 g/cm³. The 16-ton pressing machine was equipped with a vibration device, and slight high-frequency vibration was provided to make the powder densely packed and filled in a cavity of the mold, such that the powder had a high tap density in the cavity of the mold.
(6) Finally, the green body ring was subjected to sintering for 6 h at 1,280° C. and an oxygen partial pressure of 3.8 vol %, then cooled to 120° C. at an equilibrium oxygen partial pressure, and taken out.

A sample ring obtained in the above step was tested for power consumption Pcv and saturation magnetic flux density Bs on the SY8218 instrument of Iwatsu, Japan. Test conditions were as follows: Pcv was tested at 100 kHz and 200 mT; and Bs was tested at 1 kHz and 1,194 A/m. Results were recorded in Table 2.

TABLE 2

| No. | Ratio of pre-sintered materials | ui | Pcv/25° C. kW/m³ | Pcv/100° C. kW/m³ | Pcv/120° C. kW/m³ | Pcv/140° C. kW/m³ | Bs(mT)/ 25° C. | Bs(mT)/ 100° C. |
|---|---|---|---|---|---|---|---|---|
| 9  | 800° C. (90%) + 900° C. (10%) | 3321 | 237 | 292 | 327 | 367 | 539 | 416 |
| 10 | 800° C. (80%) + 900° C. (20%) | 3352 | 234 | 282 | 318 | 347 | 542 | 420 |
| 11 | 800° C. (70%) + 900° C. (30%) | 3512 | 241 | 260 | 298 | 339 | 542 | 419 |
| 12 | 800° C. (60%) + 900° C. (40%) | 3340 | 317 | 320 | 335 | 373 | 535 | 413 |
| 13 | 800° C. (50%) + 900° C. (50%) | 3289 | 334 | 359 | 385 | 408 | 536 | 410 |
| 14 | 800° C. (80%) + 900° C. (20%) | 3443 | 223 | 262 | 310 | 337 | 538 | 419 |
| 15 | 800° C. (70%) + 900° C. (30%) | 3525 | 221 | 250 | 284 | 323 | 541 | 421 |
| 16 | 800° C. (80%) + 900° C. (20%) | 3352 | 235 | 273 | 321 | 342 | 532 | 415 |
| 17 | 800° C. (70%) + 900° C. (30%) | 3427 | 230 | 261 | 290 | 331 | 542 | 420 |
| 18* | 800° C. (70%) + 900° C. (30%) | 3587 | 243 | 282 | 325 | 351 | 544 | 423 |

Figure 2:
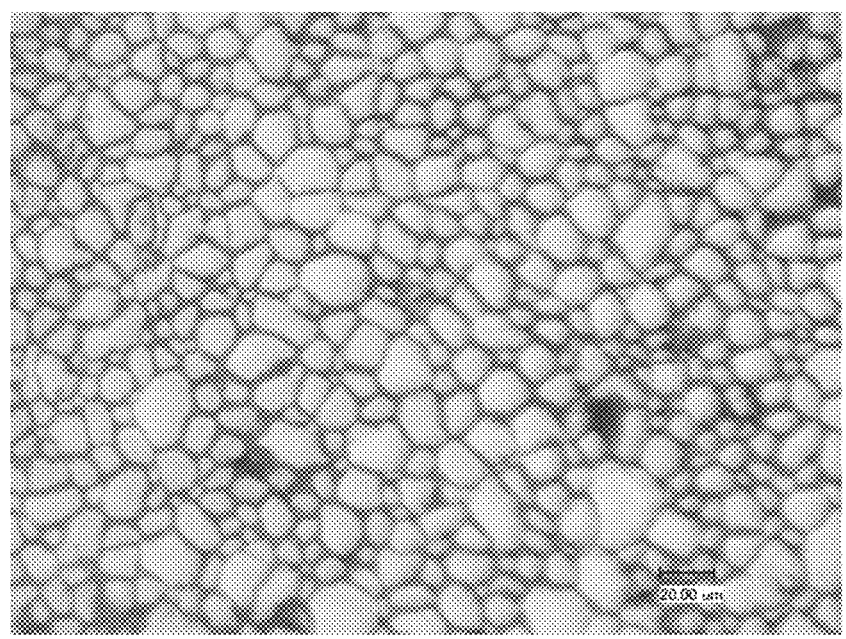
FIG. 2 is an image illustrating a metallographic structure of Example 14 of the present disclosure.

According to the data in Table 2:

In Examples 9 to 13, a temperature span of the pre-sintered materials is reduced, but a regularity is consistent with that in Table 1. It can be seen from Examples 14 and 15 that reducing an oxygen content in the pre-sintering atmosphere helps to further reduce the consumption, but if an oxygen content is too low (Examples 16 and 17), a pre-sintering reaction is inadequate and abnormal growth easily occurs during the subsequent sintering process, resulting in increased consumption. In Comparative Example 18*, a proportion of $Fe_2O_3$ in the principal formula is increased, which increases the amount of $Fe^{2+}$ and decreases the electrical resistivity, thereby causing increased consumption in a high-temperature range. An image illustrating a metallographic structure of Example 14 is shown in FIG. 2. By adopting the new process of the present disclosure, a grain size is more homogeneous, a particle size is controlled at about 10 μm to 20 μm, and the grains grown later play a role of filling pores in a matrix.

Although the examples of the present disclosure have been illustrated and described, it should be understood that those of ordinary skill in the art may make various changes, modifications, replacements and variations to the above examples without departing from the principle and spirit of the present disclosure, and the scope of the present disclosure is limited by the appended claims and legal equivalents thereof.

What is claimed is:

1. A MnZn ferrite material with a wide temperature range and low consumption, comprising principal components and auxiliary components, wherein the principal components comprise: 52.5 mol % to 53.8 mol % of $Fe_2O_3$, 8.8 mol % to 12 mol % of ZnO, and the balance of MnO;

the auxiliary components comprise: 0.35 wt % to 0.5 wt % of $Co_2O_3$, 0.03 wt % to 0.08 wt % of $CaSiO_3$, 0.01 wt % to 0.04 wt % of $Nb_2O_5$, and 0.05 wt % to 0.12 wt % of $TiO_2$ and RE elemental components; the RE elemental components comprise one or more selected from the group consisting of 0 wt % to 0.04 wt % of $Gd_2O_3$, 0 wt % to 0.02 wt % of $Ho_2O_3$, and 0 wt % to 0.03 wt % of $Ce_2O_3$; and the auxiliary components are represented by a mass percentage relative to a total mass of the $Fe_2O_3$, the MnO, and the ZnO.

2. A preparation method of the MnZn ferrite material according to claim 1, comprising the following steps:

(1) preparing the principal components $Fe_2O_3$, MnO, and ZnO according to a proportion of the principal components, mixing the principal components through one-time grinding to obtain a uniform mixed powder, and conducting pre-sintering to obtain at least two portions of MnZn ferrite pre-sintered materials with a spinel structure and an activity span by changing pre-sintering conditions; wherein the pre-sintering of each portion of MnZn ferrite pre-sintered material is conducted for 2 h to 3 h at a temperature between 700° C. and 1,000° C. and an oxygen content controlled at 5 vol % to 20 vol % by controlling a ratio of air to nitrogen;

(2) thoroughly mixing the at least two MnZn ferrite pre-sintered materials obtained under different pre-sintering conditions in a specified ratio to obtain a mixed material;

(3) adding the auxiliary components designed according to a proportion of the auxiliary component to the mixed material, and further grinding to a particle size D50 of 1.2 μm to 1.6 μm; during which deionized water was added in a deionized water-raw material ratio of 5:4 to obtain a slurry;

(4) drying the slurry obtained from the grinding, adding 15% PVA, and conducting granulation; sieving a granulation powder to remove unevenly-granulated particles, and drying the granulation powder at 100° C. to 150° C. for 10 min to 20 min to obtain a powder with prominent flowability and filling property; and pressing the powder into a green body ring having a size of 25*15*8 mm under a pressure of 300 MPa to 350 MPa; and (5) subjecting the green body ring obtained in step (4) to sintering in a bell furnace to obtain a MnZn ferrite sample ring.

3. The preparation method according to claim 2, wherein in step (2), a first portion of MnZn ferrite pre-sintered material obtained at a 700° C. or an 800° C. pre-sintering temperature and a second portion of MnZn ferrite pre-sintered material obtained at a 900° C. pre-sintering temperature are mixed.

4. The preparation method according to claim 2, wherein in step (2), the at least two MnZn ferrite pre-sintered materials are mixed by a V-shaped powder mixer or a five-axis powder mixer.

5. The preparation method according to claim 2, wherein in step (2), after a solvent is added, the pre-sintered materials are mixed; and the solvent is deionized water or ethanol.

6. The preparation method according to claim 5, wherein in step (2), a dispersant is added along with the solvent.

7. The preparation method according to claim 2, wherein in step (4), a mold equipped with a vibration device is used in the pressing, and slight high-frequency vibration is provided to make the powder densely packed and filled in a cavity of the mold, wherein the powder has a high tap density in the cavity of the mold.

8. The preparation method according to claim 2, wherein in step (5), the sintering is conducted at a holding temperature of 1,200° C. to 1,300° C., a holding time of 4 h to 8 h, and an oxygen content of 3.5 vol % to 4.6 vol %.

* * * * *